(12) United States Patent
Nordahl

(10) Patent No.: US 10,112,873 B2
(45) Date of Patent: Oct. 30, 2018

(54) CERAMICS WITH ENGINEERED MICROSTRUCTURES VIA 3D PRINTING AND TEMPLATED GRAIN GROWTH

(71) Applicant: RAYTHEON COMPANY, Waltham, MA (US)

(72) Inventor: Christopher S. Nordahl, Chelmsford, MA (US)

(73) Assignee: RAYTHEON COMPANY, Waltham, MA (US)

( * ) Notice: Subject to any disclaimer, the term of this patent is extended or adjusted under 35 U.S.C. 154(b) by 353 days.

(21) Appl. No.: 14/725,203

(22) Filed: May 29, 2015

(65) Prior Publication Data

US 2016/0347667 A1    Dec. 1, 2016

(51) Int. Cl.
| | | |
|---|---|---|
| *B29C 47/00* | (2006.01) | |
| *B29C 67/00* | (2017.01) | |
| *C04B 35/505* | (2006.01) | |
| *C04B 35/80* | (2006.01) | |
| *B33Y 70/00* | (2015.01) | |
| *C04B 35/553* | (2006.01) | |
| *B29K 309/02* | (2006.01) | |

(52) U.S. Cl.
CPC ........ *C04B 35/505* (2013.01); *B29C 47/0004* (2013.01); *B33Y 70/00* (2014.12); *C04B 35/553* (2013.01); *C04B 35/803* (2013.01); *B29K 2309/02* (2013.01); *C04B 2235/3873* (2013.01); *C04B 2235/522* (2013.01); *C04B 2235/524* (2013.01); *C04B 2235/526* (2013.01); *C04B 2235/5264* (2013.01); *C04B 2235/5276* (2013.01); *C04B 2235/5296* (2013.01); *C04B 2235/5409* (2013.01); *C04B 2235/764* (2013.01)

(58) Field of Classification Search
CPC ..... B33Y 70/00; C04B 35/505; C04B 35/553; C04B 35/803; C04B 2235/3873; C04B 2235/522; C04B 2235/524; C04B 2235/5264; C04B 2235/5276; C04B 2235/5296; C04B 2235/5409; C04B 2235/764

See application file for complete search history.

(56) References Cited

U.S. PATENT DOCUMENTS

| | | | | |
|---|---|---|---|---|
| 4,806,198 A | * | 2/1989 | Jagota | C30B 5/00 117/4 |
| 5,656,217 A | * | 8/1997 | Rogers | C04B 35/111 264/640 |
| 5,900,207 A | * | 5/1999 | Danforth | B29C 41/36 264/255 |
| 2002/0193237 A1 | | 12/2002 | Messing et al. | |
| 2010/0040767 A1 | | 2/2010 | Uibel et al. | |
| 2014/0141166 A1 | | 5/2014 | Rodgers | |

FOREIGN PATENT DOCUMENTS

| | | |
|---|---|---|
| JP | 2015150781 A | 8/2015 |
| WO | 2015054021 A1 | 4/2015 |
| WO | 2015120429 A1 | 8/2015 |
| WO | 2016059986 A1 | 4/2016 |
| WO | 2016083797 A1 | 6/2016 |

OTHER PUBLICATIONS

Bandyopadhyay, A. et al. Rapid Prototyping Journal vol. 12/3 pp. 121-128 (May 2006).*
T.F. McNulty, et al., "Development of a Binder Formulation for Fused Deposition of Ceramics," Rapid Prototyping Journal, vol. 4, No. 4, 1998, pp. 144-150.
International Search Report and Written Opinion dated Aug. 29, 2016 Application No. PCT/US2016/034932.

* cited by examiner

*Primary Examiner* — Irina S Zemel
*Assistant Examiner* — Jeffrey S Lenihan
(74) *Attorney, Agent, or Firm* — Cantor Colburn LLP

(57) ABSTRACT

A three-dimensional (3D) printing composition includes ceramic filaments comprising an additive having an aspect ratio of at least 2:1. 3D printed ceramic articles include the ceramic filaments.

14 Claims, 5 Drawing Sheets

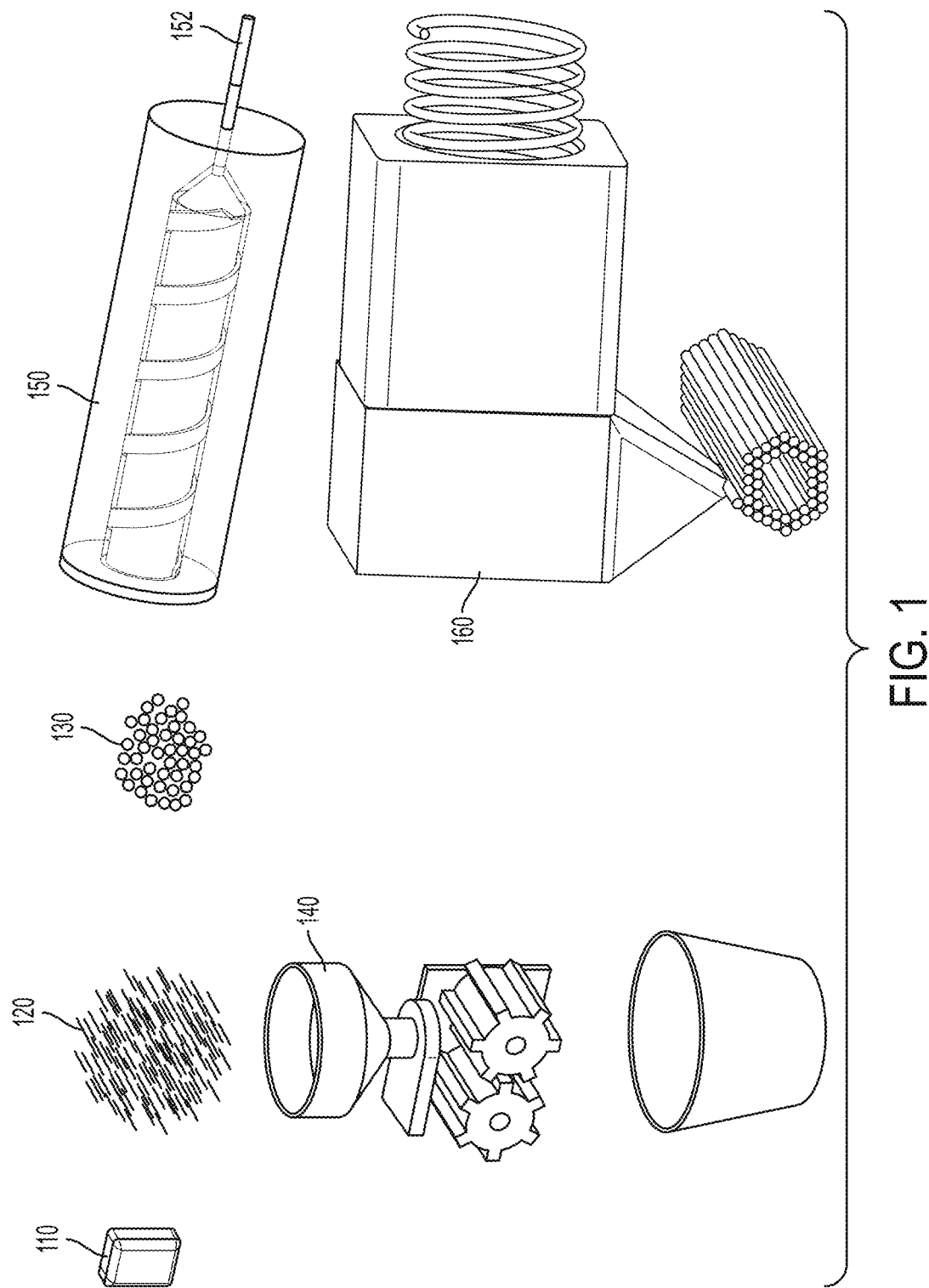

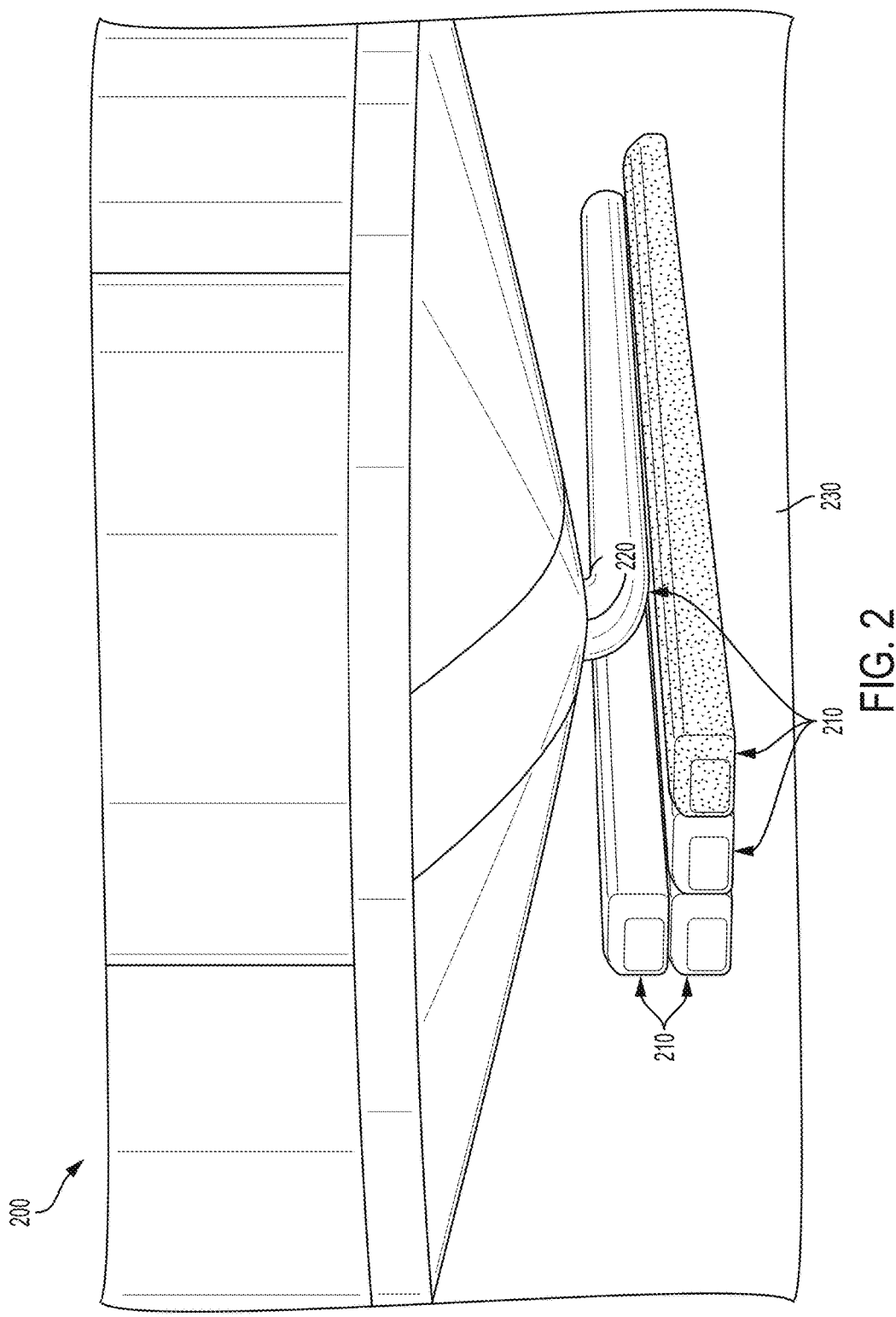

CERAMICS WITH ENGINEERED MICROSTRUCTURES VIA 3D PRINTING AND TEMPLATED GRAIN GROWTH

BACKGROUND

The present disclosure relates to three-dimensional (3D) printing, and more specifically to 3D printing of ceramics.

3D printing includes various processes to make 3D objects. Computer control is used to lay successive material layers, using a 3D model or other electronic data source to make resulting 3D objects with any shape or geometry.

Originally, the term 3D printing referred to processes that sequentially deposited layers of material onto a powder bed with inkjet printer heads. More recently, however, the definition of 3D printing has expanded to encompass a wider variety of techniques, such as extrusion and sintering-based processes. Technical standards generally use the term "additive manufacturing" for this broader sense. Binder jetting, robocasting, and fused/filament deposition modeling (FDM) are also examples of such additive manufacturing methods.

Binder jetting involves depositing an organic binder solution onto a powder bed to build up ceramic articles, layer by layer. Although binder jetting can achieve complex geometries, it cannot fabricate intricate internal patterns, channels, or honeycombs due to entrapped powder in the resulting article.

Robocasting uses the Newtonian behavior of ceramic slurries to print ceramic articles with an extruded paste. The ceramic slurry viscosity drops as it is sheared by the extrusion process. Once the paste is extruded, the shear stress on the material decreases, and the viscosity rises, returning the extrusion to a thick paste consistency. Successive layers are built-up based upon the nozzle geometry. Although robocasting can produce hollow honeycomb features, the printed ceramic article's resolution is coarse, and high density sintered ceramics cannot be obtained.

FDM uses a plastic filament or metal wire, which is unwound from a coil, to supply material to an extrusion nozzle. The nozzle is heated to melt the material, which hardens immediately after extrusion.

SUMMARY

According to one embodiment, a three-dimensional (3D) printing composition includes ceramic filaments comprising an additive having an aspect ratio of at least 2:1.

According to another embodiment, a 3D printed ceramic article includes an additive having an aspect ratio of at least 2:1.

According to yet another embodiment, a method of making a 3D ceramic article includes forming ceramic filaments comprising an additive having an aspect ratio of at least 2:1; 3D printing the ceramic filaments in successive layers to form a 3D structure; and densifying to form the 3D ceramic article.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 1 is schematic diagram of a method for making ceramic filaments.

FIG. 2 is a schematic diagram of 3D printing by FDM.

DETAILED DESCRIPTION

Figure 3A:
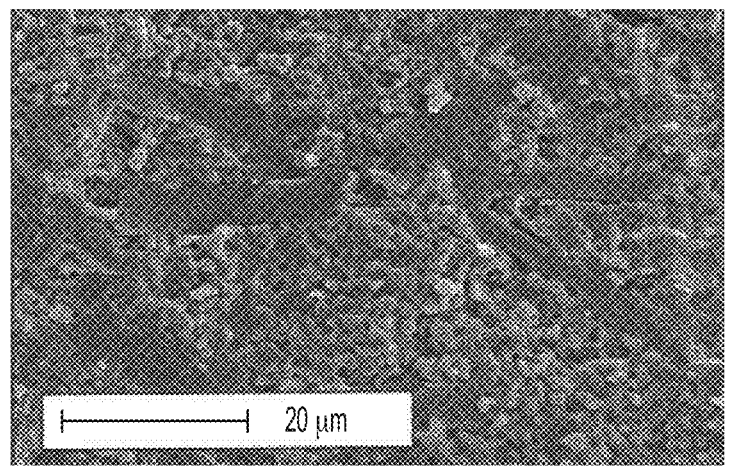
FIG. 3A is a photomicrograph of a randomly oriented textured material.

Disclosed herein are 3D printing compositions and filaments, 3D printing methods, and textured and polycrystalline 3D ceramic articles with single crystal properties. 3D ceramic articles can be ceramic parts having any size or shape desired. A 3D printing composition includes ceramic filaments including an additive having an aspect ratio of at least 2:1.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value.

Yet, in another aspect, the term "about" means within 10, 9, 8, 7, 6, 5, 4, 3, 2, or 1% of the reported numerical value.

As used herein, the terms "percent by weight," "% by weight," and "wt. %" mean the weight of a pure substance divided by the total dry weight of a compound or composition, multiplied by 100.

As used herein, the term "ceramic filament" means a structure comprising a ceramic material and having been extruded with to a length of at least 10 centimeters (cm).

As used herein, the term "additive" means any chemical, compound, particle, nanoparticle, nanotube, polymer, seed crystal, material, or mixture thereof, which is in the form of a structure having an aspect ratio of at least 2:1.

As used herein, the term "aspect ratio" when used reference to an additive means the ratio of length to diameter. The aspect ratio is expressed as two numbers separated by a colon (e.g., x:y), which represent the relationship between length and diameter.

As used herein, the term "seed crystal" means a chemical, material, or compound with a monocrystalline structure suitable for templating grain growth with a lattice mismatch to the host material of no greater than 5%. In one aspect, the lattice mismatch to the host material is no greater than 2%.

As used herein, the terms "monocrystalline" or "single crystal" mean the material's crystal lattice is continuous to its edges. As used herein, the term "polycrystalline" means the material's crystal lattice is not continuous to its edges. Polycrystalline materials can include discrete crystalline areas. Whether a material is monocrystalline or polycrystalline is determined by x-ray diffraction or transmission electron microscopy (TEM). A monocrystalline material would only exhibit specific crystallographic orientation patterns while a polycrystalline material would exhibit all crystallographic orientations.

As used herein, the term "textured" means a polycrystalline material having a monocrystalline structure (or single crystal structure) in which all of the discrete crystalline areas exhibit the same or substantially the same crystallographic orientation.

Textured ceramic materials can provide uniquely tailored properties, which depend on the orientation of template additives. Textured 3D ceramic materials are not currently possible using existing 3D printing technologies, such as robocasting and binder jetting. However, using additives in the ceramics with aspect ratios of at least 2:1 to form filaments and then 3D printing by FDM enables ceramic with textured microstructures and surfaces, as well as enhanced physical and chemical properties that do not exist in nature.

Ceramic processing and extrusion are used to prepare highly loaded ceramic filaments. Various additives are used in a ceramic matrix to form filaments for 3D printing by FDM. Depending on the type of additive, the ceramic filaments can form textured ceramic articles (e.g., using seed particles) or articles with any desired functionality (e.g., using dopants, fibers, carbon nanotubes, and the like).

Seed particles, within a ceramic matrix, are oriented by shear stress during ceramic filament extruding. The extruded filaments are fed into a 3D printer, and through FDM, the seed particles retain orientation dictated by the printing direction. During subsequent thermal processing, the polymer binders present in the composition are removed, and the ceramic article is densified. In this process, the template seeds are grown to produce a ceramic with a dense, textured ceramic with an engineered microstructure.

As described above, non-cubic materials that exhibit anisotropic properties based on their crystallographic orientation are textured by the addition of seed particles or crystals. The ceramic can be printed in desired orientations to form a ceramic article with texture in all three dimensions.

As a result, novel materials with properties that do not exist in nature can be synthesized, capitalizing on the anisotropic properties of the ceramic. These methods provide single crystal-like (monocrystalline) properties, even though they are polycrystalline, in a sintered ceramic at a fraction of the cost of single crystals, as well as textured properties in orientations not feasible by any other process.

When other additives are used, for example, needles, and fibers having aspect ratios of at least 2:1, ceramic materials and articles with any desired physical properties can be achieved. For example, needles provide improved piezoelectric responses, which can be used to form ceramic parts for sonar transducers and harmonic oscillators. In another example, fibers can provide fiber reinforced microstructures, which can be used to form ceramic parts for Small Arms Protection Inserts (SAPI) personal armor plates and up armored Humvees. The ceramic filaments and 3D articles can be used in any suitable application.

FIG. 1 is schematic diagram of an exemplary method for making 3D printing filaments. During ceramic compounding, a ceramic powder 130 is combined with a binder system 110. The ceramic powder 130 is mixed with a dispersant in a suitable solvent to coat the ceramic powder. The solvent depends on the ceramic powder 130 and dispersant used.

The ceramic powder 130 can include ceramic nanoparticles, ceramic nanograins, or ceramic composites, and is not intended to be limited. The ceramic powder 130 can be, but is not limited to, carbon, magnesium oxide, yttrium oxide, aluminum oxide, silicon carbide, aluminum nitride, silicon nitride, zirconia, or any combination thereof. The ceramic powder 130 can be any metal oxide, metal nitride, metal carbide, metal sulfide, metal selenide, or any combination thereof.

The dispersant can be a steric dispersant, an electrosteric dispersant, or an ionic dispersant. The ionic dispersant can be an acidic dispersant or a basic dispersant. The basic dispersant can be, but it not limited to, an organic base having about 6 to 28 carbon atoms and an amine head group such as, for example, caprylamine, laurylamine, stearylamine, or oleylamine. The acidic dispersant may be a fatty acid having about 6 to 28 carbon atoms and a carboxyl head group, such as, for example, capric acid, lauric acid, palmitic acid, stearic acid, myristoleic acid, palmitoleic acid, oleic acid, stearidonic acid, or linolenic acid. The dispersant can be stearic acid.

After coating the ceramic powder 130, the coated ceramic powder is compounded by combining with an additive 120 and a binder 110. Then the mixture is blended using a high shear mixer 140 to form a ceramic feedstock.

The binder can be any suitable ceramic binder and is not intended to be limited. Any suitable binder material (e.g., thermoplastic polymers) may be used. Binder materials are selected based on their compatibility with the ceramic powder material. Non-limiting examples of binders include base binders (e.g., amorphous polyalphaolefins), tackifiers (e.g., aliphatic/aromatic hydrocarbon resins), waxes (e.g., polyethylene waxes), plasticizers (e.g., polybutene, isobutylene/butane copolymers), or any combination thereof.

The binder is added in an amount depending on the type of ceramic. In one aspect, the binder is added to the ceramic composition (including the ceramic powder, dispersant, additive, and binder in solvent) in an amount in a range between about 45 to 50 volume % (vol. %). In another aspect, the binder is added in an amount in a range between about 40 and 60 vol. %. Yet, in another aspect, the binder is added in an amount about or in any range between about 40, 45, 50, 55, and 60 vol. %.

The additive can be any chemical, compound, or material, or combination thereof which is formed into a shape having an aspect ratio of at least 2:1. In one embodiment, the aspect ratio is between about 5:1 and 20:1. In another aspect, the aspect ratio is between about 5:1 and 30:1. Yet, in another aspect, the aspect ratio is about or in any range between about 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 25:1, 30:1, 35:1, 40:1, 45:1, and 50:1.

The additive is added to the ceramic composition in an amount of at least 2 wt. % based on the total weight of the ceramic in the composition. In one aspect, the additive is present in an amount in a range between about 2 and about 4 wt. % based on the total weight of the ceramic in the composition. Yet, in another aspect, the additive is present in an amount of about or in any range between about 1, 2, 3, 4, 5, 6, 7, 8, 9, and 10 wt. %.

Non-limiting examples of suitable additives include a seed particle or crystal (including a crystalline material), a dopant, a fiber, a whisker, a needle, a carbon nanotube, or any combination thereof. The additive can include any crystalline material, synthetic material, or polymeric material. Non-limiting examples of suitable additives include leucite, lithium disilicate, silicon nitride, glass (e.g., silica), or any combination thereof.

Non-limiting examples of crystalline materials include YAG (yttrium aluminum garnet), YLF (yttrium lithium fluoride), sapphire (aluminum oxide), LiSAF (lithium strontium aluminum fluoride), yttrium oxide, cubic oxides, and combinations thereof.

Suitable dopants include rare earth elements and liquid phase formers. Non-limiting examples of dopants include chromium ions, neodymium ions, erbium ions, ytterbium ions, titanium ions, or any combination thereof. Liquid phase formers will form a liquid phase at elevated temperatures, which allow for increased diffusion rates that facilitate more rapid texture development.

After compounding 140, the feedstock is screw-extruded 150 through an orifice 152 having any desired diameter. The filament diameter can be tailored as desired and is not intended to be limited. The filament diameter can be, for example, between about 1 and 10 millimeters (mm). Then the extruded filaments are 3D printed via fused deposition modeling 160.

The additives become aligned or oriented within the filaments. In one embodiment, at least 50% of the additive is aligned with respect to the extrusion direction and with less than 30° misorientation. Alignment with respect to the extrusion direction means that the additive is oriented in the same direction or in the axis of the extrusion direction, within +/−30°.

In other embodiments, at least 60, 70, 80, 90, 92, 95, 97, 99, or 100% of the additive is aligned with respect to the extrusion direction, and with less than 30, 20, or 10° misorientation.

Additive alignment can be measured by analysis of cross-sectional micrographs. Image analysis software can ascertain the identity of the additives and the alignment with respect to a known axis provided there is a distinguishable contrast difference.

The filaments are then spooled for use in an FDM 3D printing machine. Computer aided design files and slicing models are modified to print the 3D ceramic articles in the desired print pattern, as opposed to pre-determined optimal printing patterns generated by 3D printing software.

FIG. 2 is a schematic diagram of an exemplary method 200 of 3D printing using FDM, as commercially available from Stratasys, Inc. (Eden Prairie, Minn.). The additive infused ceramic filaments are unwound and supplied to an extrusion nozzle 220 that can turn the flow on and off. The extrusion nozzle 220 is heated to melt the material in the filaments. Both the extrusion nozzle 220 and the base 230 are controlled by a computer that translates the dimensions of an object into x, y, and z coordinates for the extrusion nozzle 220 and base 230 to follow during printing. The extrusion nozzle 220 can be moved in both horizontal and vertical directions by a numerically controlled mechanism. The extrusion nozzle 220 follows a path controlled by a computer-aided manufacturing (CAM) software package, and the ceramic part or article is built from the bottom up, one successive layer at a time. The ceramic material extruded is initially in an elongated tubular form 210, which is successively layered to form a ceramic article in the green state.

The green state ceramic is then densified to form a final finished ceramic article. Densification renders the green state ceramic to its denser and stronger finished state. Densification also reduces porosity of a green state ceramic, thereby increasing density. Physical properties (e.g., mechanical strength, electrical properties, etc.) may benefit from a high relative density. Densification includes removing the binder, sintering, hot pressing, hot isostatic pressing (HIP), or any combination thereof.

The binder may be removed by heating the green ceramic to substantially burnout or vaporize the binder. The temperatures used for removing the binder may be between 200 and 600° C. Any suitable furnace or oven may be used to heat the green state ceramic. The binder also may be removed through solvent extraction. Removing the binder is advantageous because binder residues may interfere with the process of eliminating porosity during densification.

After removing the binder, the ceramic article is sintered. Sintering includes heating the material to between 1,000 and 2,000° C., depending on the materials. Sintering is performed using a vacuum furnace, a high temperature furnace, a high temperature controlled atmospheric furnace (e.g., pure oxygen, helium, helium oxygen gas mixtures), a hot press, or a hot isostatic press or any other suitable solid state sintering method. The same furnace used for removing the binder may be used for sintering.

During sintering, the powders that are used to manufacture the green state ceramic are densified and transformed to a strong, dense ceramic body upon heating. Sintering may reduce porosity within a green state ceramic and enhance properties, such as strength. During the sintering firing process, particles diffuse together, forming larger grains such that the porosity may be substantially eliminated. Accordingly, the grain size of the particles may become larger than the starting grain size. Sintering may result in full densification of the green state ceramic.

After sintering, optionally, HIP may be used. HIP can further reduce or eliminate any residual porosity that may remain. The sintered ceramic is subjected to elevated temperature and an isostatic pressure in a high pressure containment vessel. Equal amounts of pressure (isostatic) are applied to the ceramic from all directions. A pressurizing inert gas (e.g., argon) may be used. At elevated temperatures and pressures, the argon gas liquefies, and the liquid at high pressure exerts the isostatic pressure on the ceramic article. A gas pumping system can be used to achieve pressure level.

HIP reduces porosity and increases the density of the ceramic material. HIP may also improve mechanical properties.

3D printing of ceramic articles with additives as described provides several advantages. These methods can be used to make ceramics with complex geometries and internal features that are not achievable with binder jetting methods. Further, higher resolution and sintered density is achievable compared to robocasting. Additionally, textured ceramics with monocrystalline properties, which was previously very expensive, can be made for a fraction of the cost.

Figure 3B:
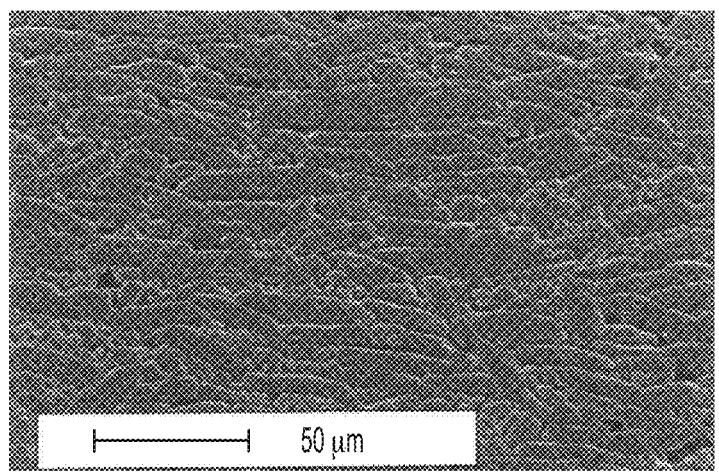
FIG. 3B is a photomicrograph of a ceramic material with two-dimensional (2D) platelet ordering.

For comparison, FIGS. 3A and 3B show ceramic materials with and without 2D and 3D order as provided in U.S. Pat. No. 6,251,335 to Messing, et al. FIG. 3A is a photomicrograph of an aluminum oxide ceramic material without any ordered texture. As shown, the texture is random in orientation. FIG. 3B is a photomicrograph of a ceramic tape with platelet ordering in two dimensions.

EXAMPLES

Example 1

Two batches of powder were prepared: 1) 300 g yttrium oxide (specific surface area (SSA) of 1.86 m$^2$/g); and 2) 300 g yttrium oxide with 10% $Si_3N_4$ whiskers (~1 micron diameter and 20 micron length). The powders were ball milled in toluene with stearic acid (a dispersant) then vacuum filtered.

A four-component binder system was blended and cast into pucks, which included:
 a base binder: 71 wt. % amorphous polyalphaolefin;
 a tackifier: 14 wt. % aliphatic/aromatic hydrocarbon resin;
 a wax: 11 wt. % polyethylene wax; and
 a plasticizer: 4 wt. % polybutene.

The batches were compounded and extruded to form ceramic filaments. FDM was conducted on both filaments to form ceramic articles.

Figure 4A:
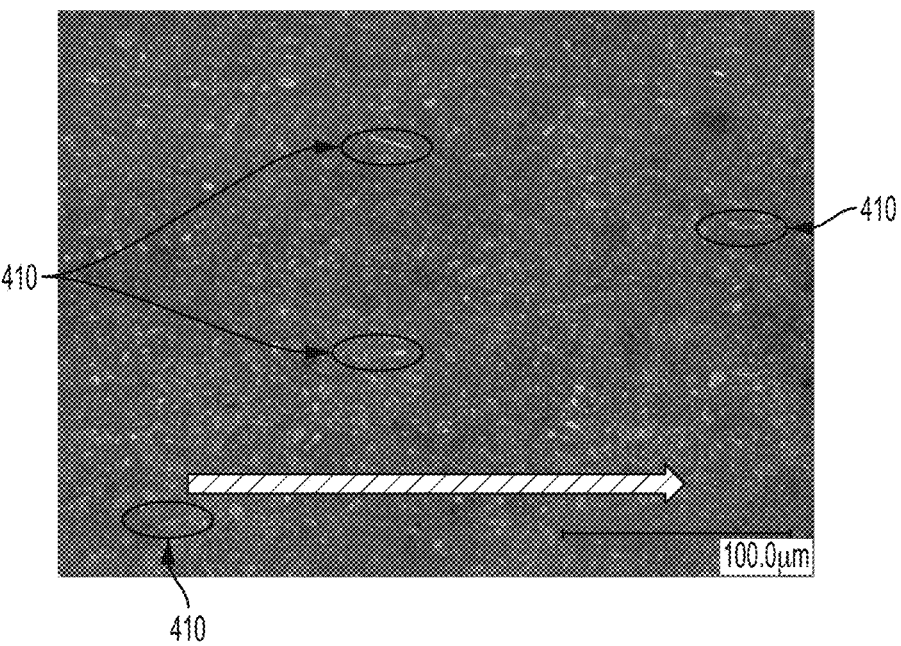
FIG. 4A is a photomicrograph of extruded ceramic filaments (arrow indicates extrusion direction) with aligned $Si_3N_4$ whiskers.

FIG. 4A is a photomicrograph of filaments with aligned $Si_3N_4$ whiskers 410 in the yttrium oxide+$Si_3N_4$ whisker batch. As shown, the whiskers 410 are aligned in the extrusion direction (see arrow).

Example 2

A torque rheometer was used to extrude the filament. The torque rheometer measured force versus temperature and enabled small batch material optimization. The optimum temperature was 95° C. The measurement results are shown in Table 1 below.

TABLE 1

Torque Rheometer measurements

| Filament # | Material | Temperature | Speed (mm/sec) | Max Force Observed (N) | Viscosity |
|---|---|---|---|---|---|
| 1 | Whisker Batch | 90° C. | 0.61 | ~8000 | 1381 |
| 2 | Whisker Batch | 95° C. | 0.61 | 5342 | 922 |
| 3 | Whisker Batch | 100° C. | 0.61 | ~4900 | 846 |
| 4 | Powder Batch | 95° C. | 0.61 | 3344 | 577 |

The spoolable material of each batch had a uniform cross section of about 1.7 mm. As shown in Table 1, the 10% $Si_3N_4$ whisker batch was more viscous than the powder batch without the whiskers.

Weight loss during binder burnout was measured using thermal gravimetric analysis (TGA). There was approximately 13.3 wt. % loss in the yttrium oxide alone (corresponding to a 56 vol. % solids) and 14.0 wt. % loss in the yttrium oxide+$Si_3N_4$ whiskers.

Example 3

Figure 4B:
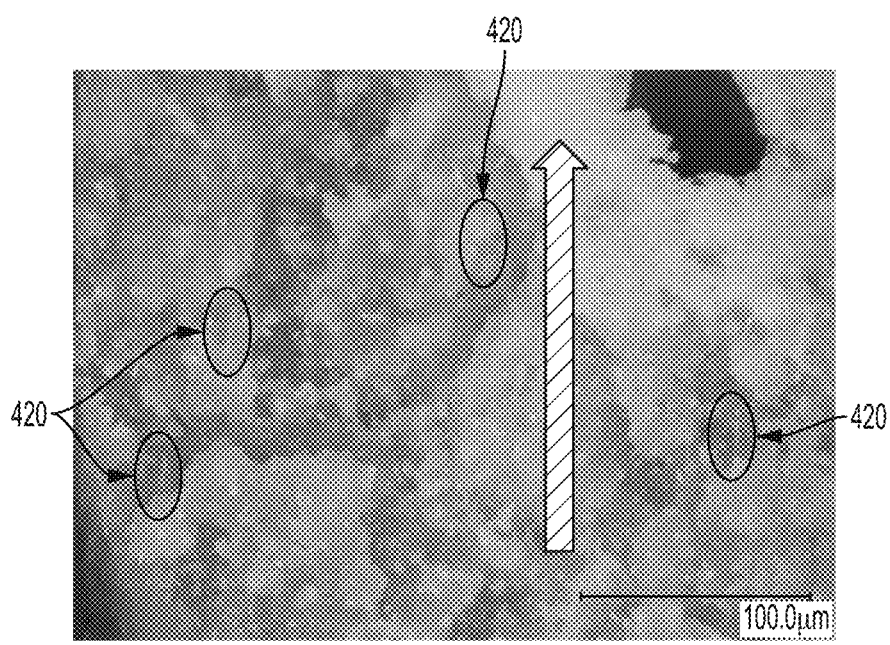
FIG. 4B is a photomicrograph of a ceramic coupon 3D printed via FDM through a 0.2-millimeter (mm) nozzle (arrow indicates printing direction) produced with the filaments of FIG. 4A showing further alignment of the whisker additives.

Ceramic coupons and green printed parts were prepared. FIG. 4B is a photomicrograph of a 3D printed ceramic coupon produced with the filaments of FIG. 4A (yttrium oxide+$Si_3N_4$ whiskers). As shown, the printed ceramic coupon also shows $Si_3N_4$ whisker 420 alignment in the extrusion direction (see arrow).

Example 4

Figure 5A:
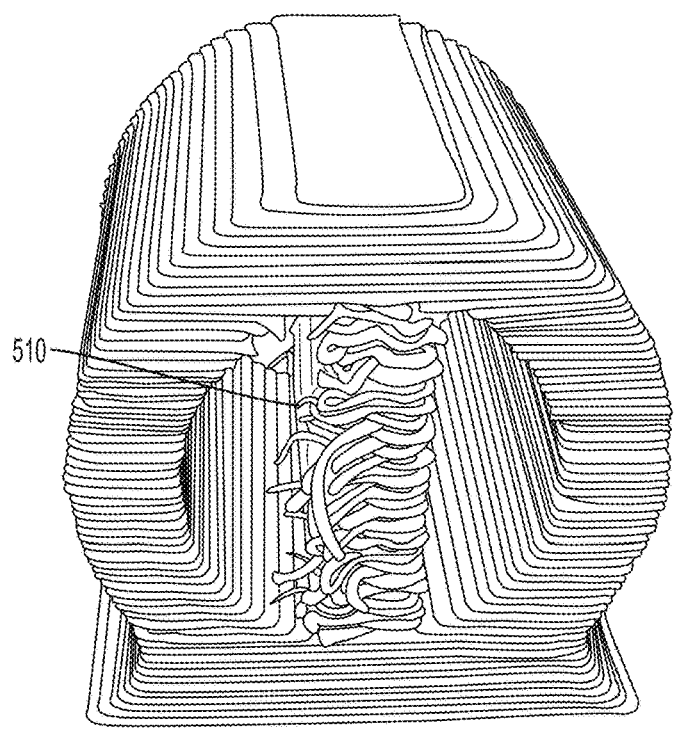
FIG. 5A is a 3D printed ceramic cylinder in the green state.

A ceramic cylinder was 3D printed by FDM using the yttrium oxide+$Si_3N_4$ whisker batch. FIG. 5A shows a ceramic cylinder in the green state. The filaments are oriented in the direction of the page. A central physical support 510 was required to prevent slumping at >68° overhang, which refers to the maximum angle that is printable without requiring a support structure.

Figure 5B:
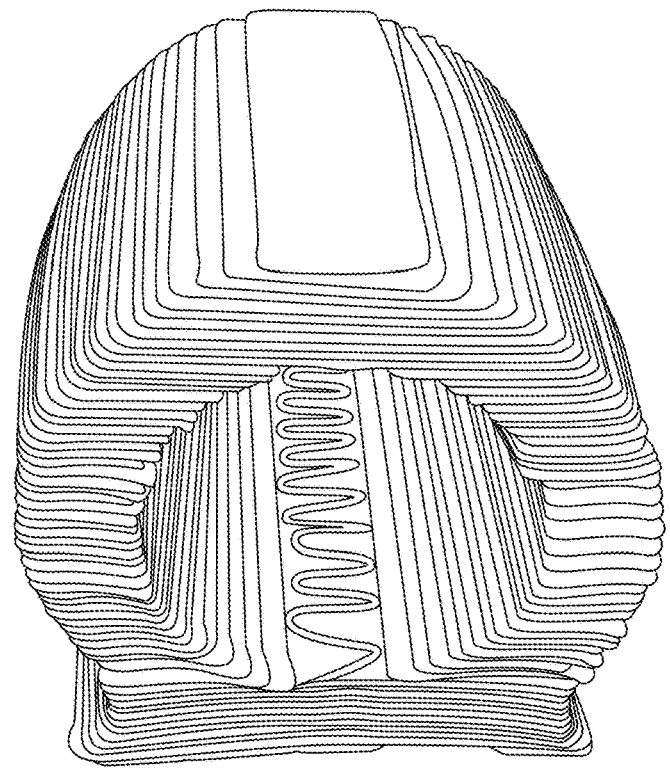
FIG. 5B is the 3D printed ceramic cylinder of FIG. 5A after bisque firing.

FIG. 5B shows the 3D printed ceramic cylinder of FIG. 5A after bisque firing. As shown, the central support 510 is easily removed after 700° C. bisque firing.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A three-dimensional (3D) printing composition, comprising:
 ceramic filaments, each ceramic filament comprising an additive and having an extrusion direction, at least 50% of the additive of each ceramic filament being aligned with respect to the extrusion direction, and each additive having an aspect ratio of at least 2:1.

2. The 3D printing composition of claim 1, wherein the additive is present in an amount of at least 2 weight % (wt. %).

3. The 3D printing composition of claim 1, further comprising a dispersant.

4. The 3D printing composition of claim 1, wherein the additive is a seed crystal.

5. The 3D printing composition of claim 1, wherein the additive is a dopant, a fiber, a whisker, a needle, a carbon nanotube, or any combination thereof.

6. The 3D printing composition of claim 1, wherein the 3D printing composition further comprises a binder.

7. A method of making a 3D ceramic article, the method comprising:
forming ceramic filaments comprising an additive having an aspect ratio of at least 2:1, at least 50% of the additive being aligned with respect to an extrusion direction of the ceramic filaments;
3D printing the ceramic filaments in successive layers to form a 3D structure; and
densifying to form the 3D ceramic article.

8. The method of claim 7, wherein the additive is a seed crystal, a dopant, a fiber, a whisker, a needle, a carbon nanotube, or any combination thereof.

9. The method of claim 7, wherein the 3D ceramic article has a textured surface.

10. The method of claim 7, wherein forming the ceramic filaments comprises extruding a ceramic composition comprising the additive in an amount of at least 2 wt. %.

11. The method of claim 7, wherein forming ceramic filaments comprises mixing ceramic powder and a dispersant in a solvent and then drying to form a coated ceramic composition.

12. The method of claim 11, further comprising mixing the coated ceramic mixture with the additive and a binder.

13. The method of claim 7, wherein 3D printing is filament deposition modeling.

14. The method of claim 7, wherein densifying is removing a binder, sintering, hot isostatic pressing, or any combination thereof.

* * * * *